(12) United States Patent
Kondo

(10) Patent No.: US 6,580,745 B1
(45) Date of Patent: Jun. 17, 2003

(54) SPREAD SPECTRUM COMMUNICATION SYSTEM AND OVERLOAD CONTROL METHOD THEREFOR

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,920

(22) Filed: Mar. 18, 1999

(30) Foreign Application Priority Data

Mar. 26, 1998 (JP) ............................................ 10-079475

(51) Int. Cl.[7] ................................................ H04B 1/69
(52) U.S. Cl. ...................................... 375/130; 375/147
(58) Field of Search ................................ 375/130, 147, 375/145; 455/70, 436, 437, 414, 434; 370/331, 335, 342

(56) References Cited

U.S. PATENT DOCUMENTS

| | | | |
|---|---|---|---|
| 5,590,409 A | 12/1996 | Sawahashi et al. ............ | 455/69 |
| 5,604,730 A | 2/1997 | Tiedemann, Jr. ............ | 370/252 |
| 5,896,411 A * | 4/1999 | Ali et al. .................... | 375/130 |
| 6,396,867 B1 * | 5/2002 | Tiedmann et al. .......... | 370/342 |
| 6,434,367 B1 * | 8/2002 | Kumar et al. ............... | 370/331 |

FOREIGN PATENT DOCUMENTS

| | | |
|---|---|---|
| EP | 0 671 819 | 9/1995 |
| EP | 0 682 418 | 11/1995 |
| JP | 6-132872 | 5/1994 |
| JP | 8-32513 | 2/1996 |
| JP | 8-32514 | 2/1996 |
| JP | 9-36801 | 2/1997 |
| JP | 9-139712 | 5/1997 |
| JP | 9-247085 | 9/1997 |

* cited by examiner

*Primary Examiner*—Khai Tran
(74) *Attorney, Agent, or Firm*—Young & Thompson

(57) ABSTRACT

In an overload control method for a spread spectrum communication system, when the number of mobile stations communicating with a base station is equal to or more than a predetermined number, the ratio of increase instructions to reverse link transmission power control bits transmitted to the mobile stations from the base station is measured. When the measured ratio is equal to or more than a predetermined ratio, it is determined whether the reverse link interference amount between the base station and the mobile stations is equal to or more than an allowable value. When it is determined that the reverse link interference amount is equal to or more than the allowable value, the reverse link interference amount is reduced by imposing transmission power restrictions or origination/termination restrictions.

16 Claims, 10 Drawing Sheets

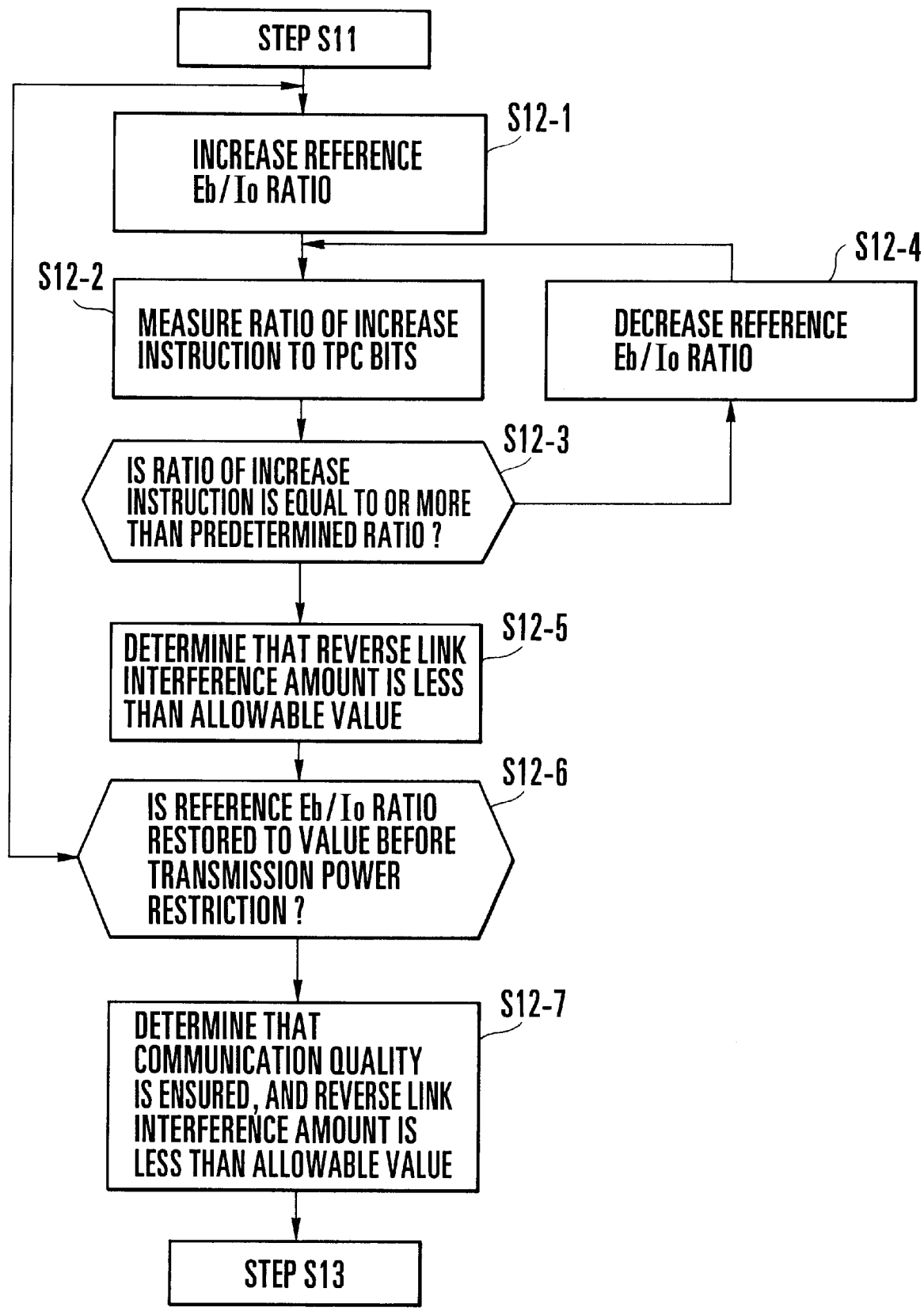
F I G. 8

SPREAD SPECTRUM COMMUNICATION SYSTEM AND OVERLOAD CONTROL METHOD THEREFOR

BACKGROUND OF THE INVENTION

The present invention relates to a spread spectrum communication system and an overload control method for a case wherein the interference amount of a reverse link signal in communication between a mobile station and a base station in a cell (communication from the mobile station to the base station) is equal to or larger than an allowable value in the spread spectrum communication system.

In a spread spectrum communication system, a plurality of communications can be performed by using the same frequency band. This is because each communication is spread-modulated with codes having orthogonality on the transmission side, and each communication can be specified by spread-demodulation (despreading) with the same codes on the reception side.

This orthogonality is made imperfect by propagation delay differences due to geographical and weather conditions and the like and time deviations due to multipath in the propagation path between the mobile station and the base station, and multipath associated with irrelevant codes, i.e., irrelevant communication, and multipath associated with relevant codes, i.e., relevant communication, have correlation components in some case. These correlation components become interference components in the relevant communication, resulting in a deterioration in communication quality. Since interference components are generated by such a factor, interference components increase as the number of communications increases.

In a radio communication system, a predetermined signal/noise ratio is generally required to ensure high communication quality. In a spread spectrum communication system, since each communication is performed by using the same frequency band, a predetermined signal/(noise+interference) ratio is required to ensure high communication quality. This ratio is generally expressed as a signal/interference ratio= Eb/IO ratio (Eb: desired reception wave power, and IO: interference wave power). In addition, the Eb/IO required to ensure predetermined communication quality is expressed as a specified Eb/IO ratio.

In general, communication quality is determined on the basis of a frame error rate (FER). The Eb/IO ratio required to obtain a given FER changes owing to the influences of fading frequencies and Eb/IO ratio measurement accuracy, and hence needs to be always corrected. For this reason, a base station changes the Eb/IO ratio specified to obtain the FER required to guarantee communication quality in accordance with the measured FER of a received radio wave such that the FER required to guarantee the communication quality remains constant. This function is called outer loop control.

In general, as the number of communications increases, since the interference wave (IO) increases, the Eb/IO ratio decreases. In this case, a base station increases the transmission output of each mobile station to increase the signal level (Eb) so as to ensure the specified Eb/IO ratio in each communication.

In a spread spectrum communication system, however, since excessive signal energy causes interference in irrelevant and relevant communications, the Eb/IO ratios in the respective communications in the base station must be made almost equal. The base station therefore controls the transmission power of each mobile station to make the Eb/IO ratios in the respective communications almost equal. This control is called high-speed closed loop control because the control operation is performed at high speed by feedback control between a mobile station and a base station to absorb level variations such as fading.

An Eb/IO ratio as a reference in high-speed closed loop control will be referred to as a reference Eb/IO ratio. In general, this reference Eb/IO is set to be equal to the specified Eb/IO. That is, the Eb/IO ratio specified to obtain an FER that guarantees communication quality and obtained by outer loop control is set to the reference Eb/IO ratio in high-speed closed loop control, and each mobile station is instructed to increase/decrease the transmission power such that the Eb/IO ratio obtained by reception power from each mobile station is set to this reference Eb/IO ratio in the base station.

A combination of this outer loop control and high-speed closed loop control will be referred to as transmission power control.

As shown in FIG. 10A, however, when the communication amount becomes a predetermined amount or more, even if the signal level (Eb) is increased, the interference amount increases accordingly. As a result, as shown in FIG. 10B, the specified Eb/IO cannot be obtained. In this case, if the communication amount further increases, all communications are disabled. This state is a state in which the interference amount is equal to or larger than the allowable value.

Another problem is that the base station continuously increases the transmission output of each mobile station to obtain the specified Eb/IO ratio in each communication, and unnecessarily large interference is caused in neighboring base stations as well. As a result, the communication capacities of the neighboring base stations decrease. In the worst case, communication failures occur in the neighboring base stations. Furthermore, a chain reaction occurs in such a manner that communication quality deteriorates or communication failures occur in a wide range.

In a conventional technique (IS-95 system), that the reverse link interference amount between communications in a cell is equal to or larger than an allowable value is detected in accordance with a decrease in FER of reverse link radio frames owing to a failure to obtain the specified Eb/IO ratio. On the basis of this detection result, origination/termination control is performed for the base station in which the reverse link interference amount is equal to or larger than the allowable value and mobile stations belonging to the neighboring stations, thus reducing a deterioration in communication quality.

To increase the FER measurement accuracy, however, many samples are required, and hence it takes much time to detect such a deterioration. For this reason, the transmission power of each mobile station belonging to the base station in which the reverse link interference amount between communications in the cell is equal to or larger than the allowable value is further increased until a deterioration is detected. Meanwhile, excess interference occurs in the neighboring base stations.

In the above conventional spread spectrum communication system, it takes much time to detect that the interference amount between communications in a cell is equal to or larger than the allowable value, because this detection is based on detection of a decrease in FER.

SUMMARY OF THE INVENTION

It is an object of the present invention to provide a spread spectrum communication system which can detect in a short time that the reverse link interference amount between communications in a cell is equal to or larger than an allowable value.

In order to achieve the above object, according to the present invention, there is provided an overload control method for a spread spectrum communication system, comprising the steps of, when the number of mobile stations in the process of communication with a base station in a self-cell is not less than a predetermined number, measuring a ratio of increase instructions to reverse link transmission power control bits contained in radio frames transmitted to the mobile stations from the base station and indicating increases/decreases in transmission power of the mobile stations, when the measured ratio of increase instructions is not less than a predetermined ratio, determining that a reverse link interference amount between the base station and the mobile stations is not less than an allowable value, and when it is determined that the reverse link interference amount between the communications is not less than the allowable value, reducing the reverse link interference amount between the communications by performing at least one of transmission output restriction and origination/termination restriction.

BRIEF DESCRIPTION OF THE DRAWINGS

FIG. 8 is a flow chart showing the detailed processing in step S12 in the flow chart of FIG. 7;

DESCRIPTION OF THE PREFERRED EMBODIMENTS

The present invention will be described in detail below with reference to the accompanying drawings.

First Embodiment

Figure 1:
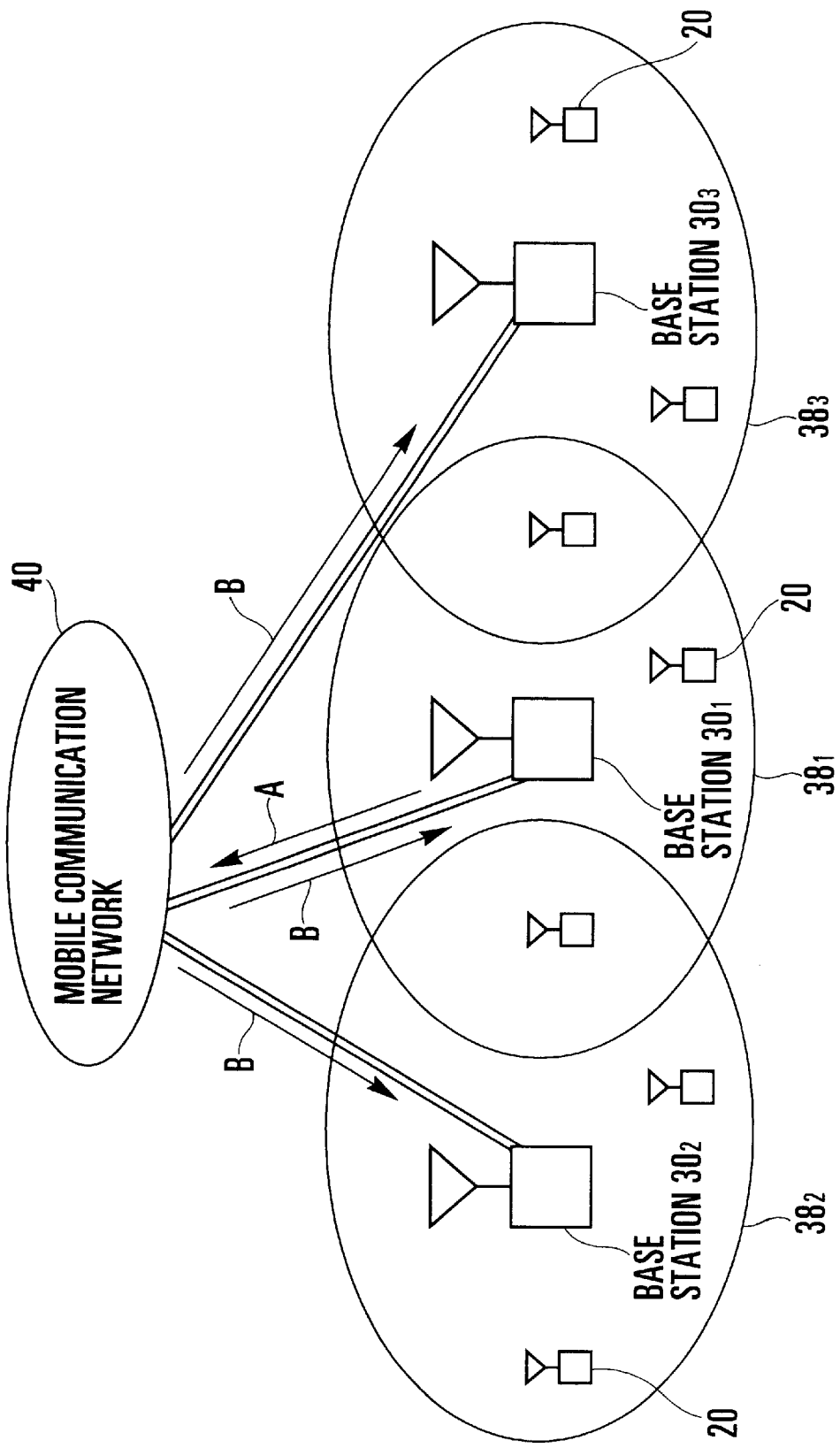
FIG. 1 is a view showing the arrangement of a spread spectrum communication system according to the first embodiment of the present invention.

FIG. 1 shows the arrangement of a spread spectrum communication system according to the first embodiment of the present invention. Referring to FIG. 1, the spread spectrum communication system of this embodiment is comprised of a mobile communication network 40 constituted by a mobile communication switching center (not shown) and the like, a plurality of base stations $30_1$ to $30_3$ connected to the mobile communication network 40, and a plurality of mobile stations 20 that move in cells $38_1$ to $38_3$ formed by the base stations $30_1$ to $30_3$.

In spread spectrum communication, the radio waves transmitted from the respective mobile stations 20 must reach the base stations $30_1$ to $30_3$ with almost constant reception power. For this purpose, the base stations $30_1$ to $30_3$ control the transmission power of the respective mobile stations 20. If the power received by each of the base stations $30_1$ to $30_3$ is higher than a specified Eb/IO ratio, each base station outputs a transmission power decrease instruction to the corresponding mobile station 20. If the received power is lower than the specified Eb/IO, each of the base stations $30_1$ to $30_3$ outputs a transmission power increase instruction to the corresponding mobile station 20.

These increase and decrease instructions are expressed by TPC (Transmission Power Control) bits contained in data transmitted from the base stations $30_1$ to $30_3$ to the respective mobile stations 20.

Figure 2:
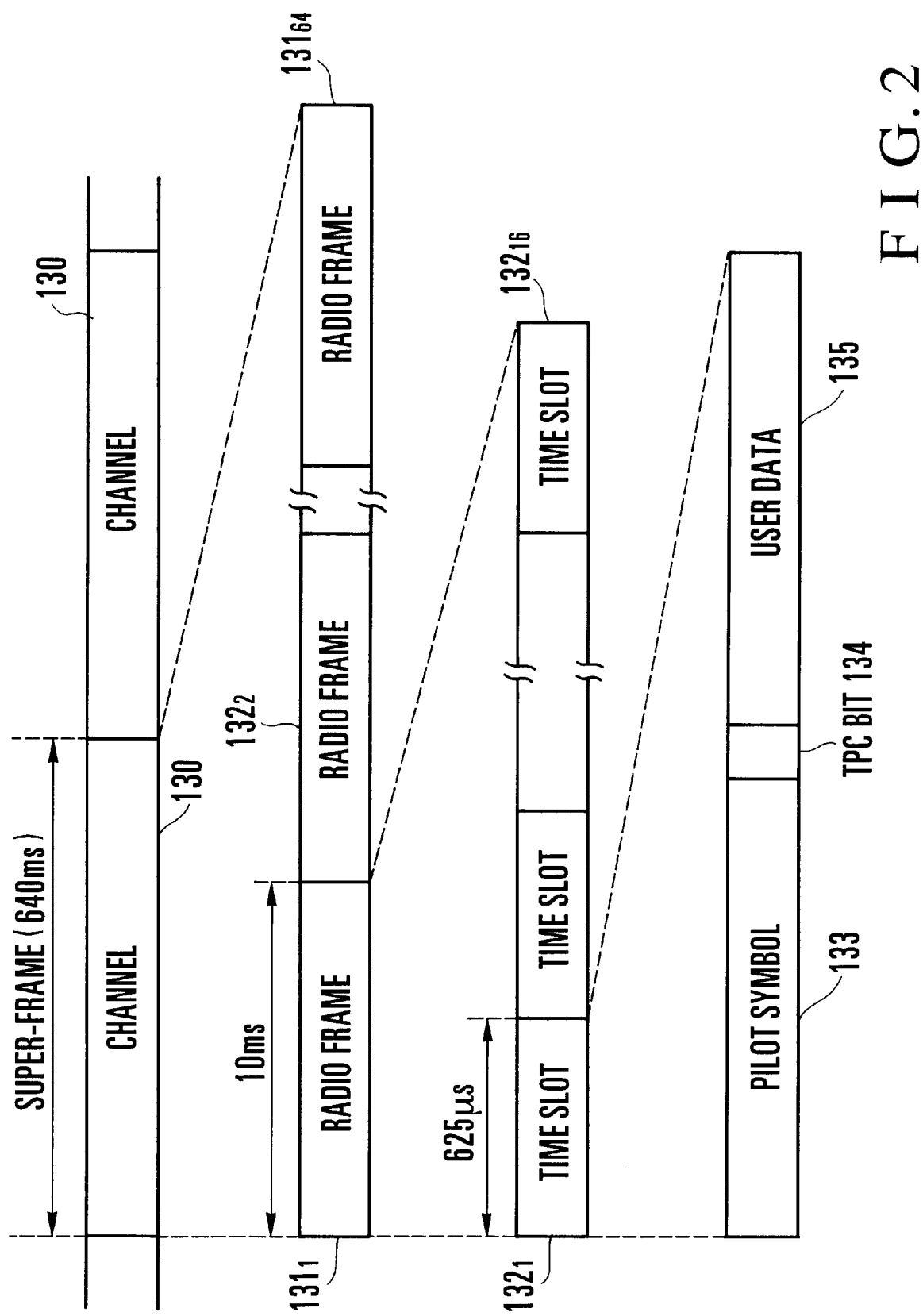
FIG. 2 is a view showing the structure of transmission data from a base station to each mobile station in FIG. 1.

FIG. 2 shows the structure of data transmitted from each of the base stations $30_1$ to $30_3$ to the corresponding mobile station 20.

Referring to FIG. 2, the data consists of a plurality of channels 130. The respective channels 130 are called superframes that are arranged at 640-ms intervals. Each channel 130 consists of 64 radio frames $131_1$ to $131_{64}$. Each of the radio frames $131_1$ to $131_{64}$ consists of 16 time slots $132_1$ to $132_{16}$. In each channel 130 as a normal traffic channel, each of the time slots $132_1$ to $132_{16}$ is made up of a pilot symbol 133, a TPC bit 134, and user data 135.

As described above, the TPC bits 134 are set in the respective time slots $132_1$ to $132_{16}$, and hence are transmitted from each base station to the corresponding mobile station at 0.625-ms intervals. For this reason, each mobile station 20 changes its transmission output at 0.625-ms intervals.

Assume that in each of the base stations $30_1$ to $30_3$, the number of mobile stations 20 in the process of communication is equal to a predetermined number or more, and the reverse link interference amount between the communications in each cell is smaller than an allowable value. In this case, since the mobile stations 20 independently operate, the ratio of increase instructions for transmission power control to the ratio of decrease instructions become almost equal as a whole in each base station.

In this case, the reason why the number of mobile stations 20 is limited to the predetermined number or more is that if, for example, the number of mobile stations 20 is one, and the mobile station 20 moves away from a corresponding one of the base stations $30_1$ to $30_3$, the ratio of increase instructions for transmission power control becomes 100%. As described above, when the number of mobile stations 20 is small, the ratios of increase and decrease instructions greatly change in accordance with the operation of each mobile station 20. If, however, the number of mobile stations 20 is the predetermined number or more, the portion of increase instructions becomes almost equal to that of decrease instructions in terms of probability. Since each of the base stations $30_1$ to $30_3$ manages the number of radio channel resources that can be used in the self-cell, the number of mobile stations 20 that are currently present in the self-cell can be known from the use state (allocation state) of these radio channel resources.

Figure 3:
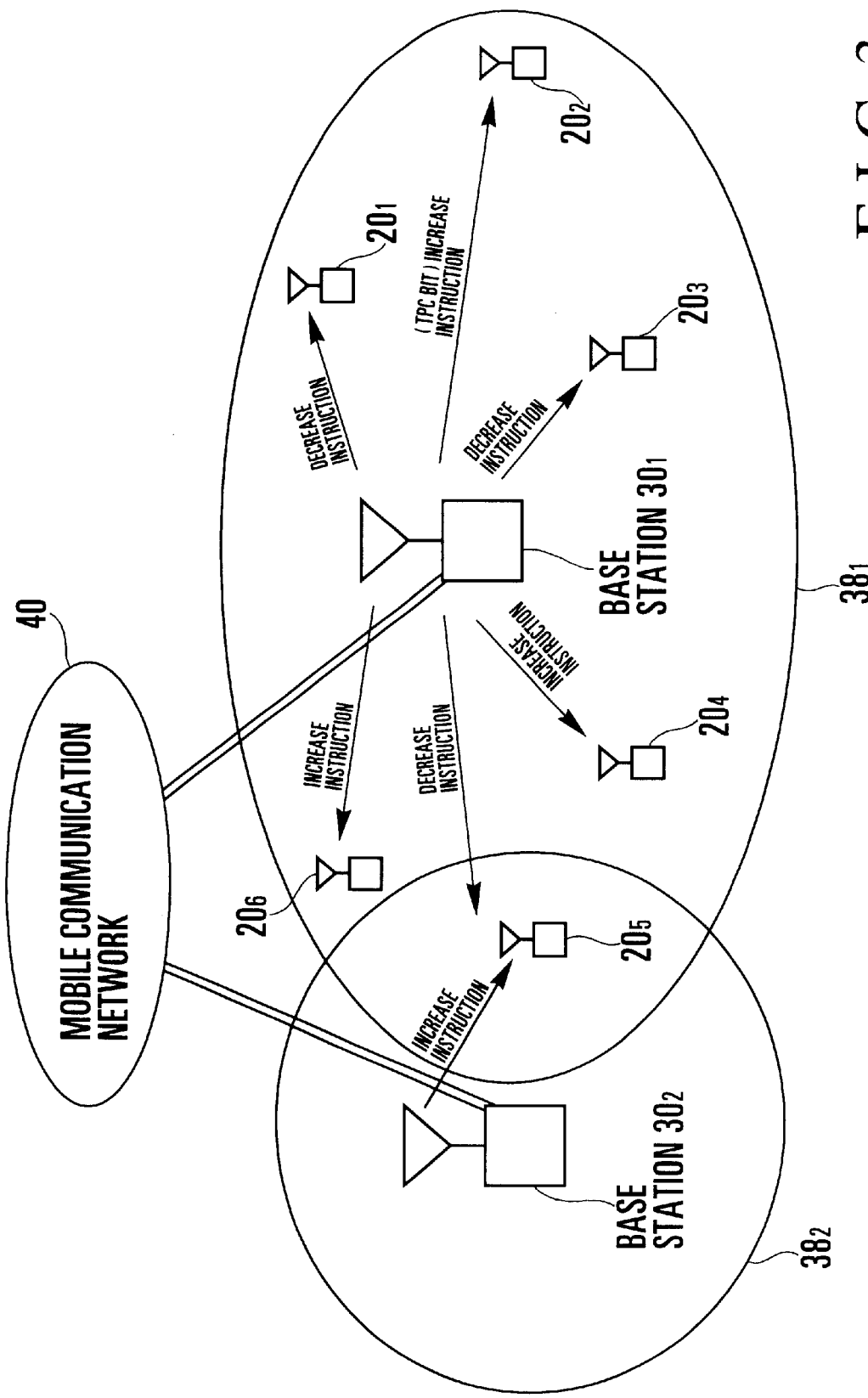
FIG. 3 is a view showing the operation of a base station in the spread spectrum communication system in FIG. 1 in a case wherein the ratio of transmission power increase instructions is almost equal to the ratio of transmission power decrease instructions.

FIG. 3 shows the operation of the base station $30_1$ in the system in FIG. 1 in a case wherein the portion of transmission power increase instructions is almost equal to that of decrease instructions.

Referring to FIG. 3, six mobile stations $20_1$ to $20_6$ are present in the cell $38_1$. If the reverse link interference amount between the respective communications in the cell does not exceed the allowable value, and the normal radio communication quality is maintained, increase and decrease instructions represented by TPC bits as bits that are used by the base station $30_1$ to output reverse link transmission power instructions to the mobile stations $20_1$ to $20_6$ are contained in data in almost equal ratios.

Figure 4:
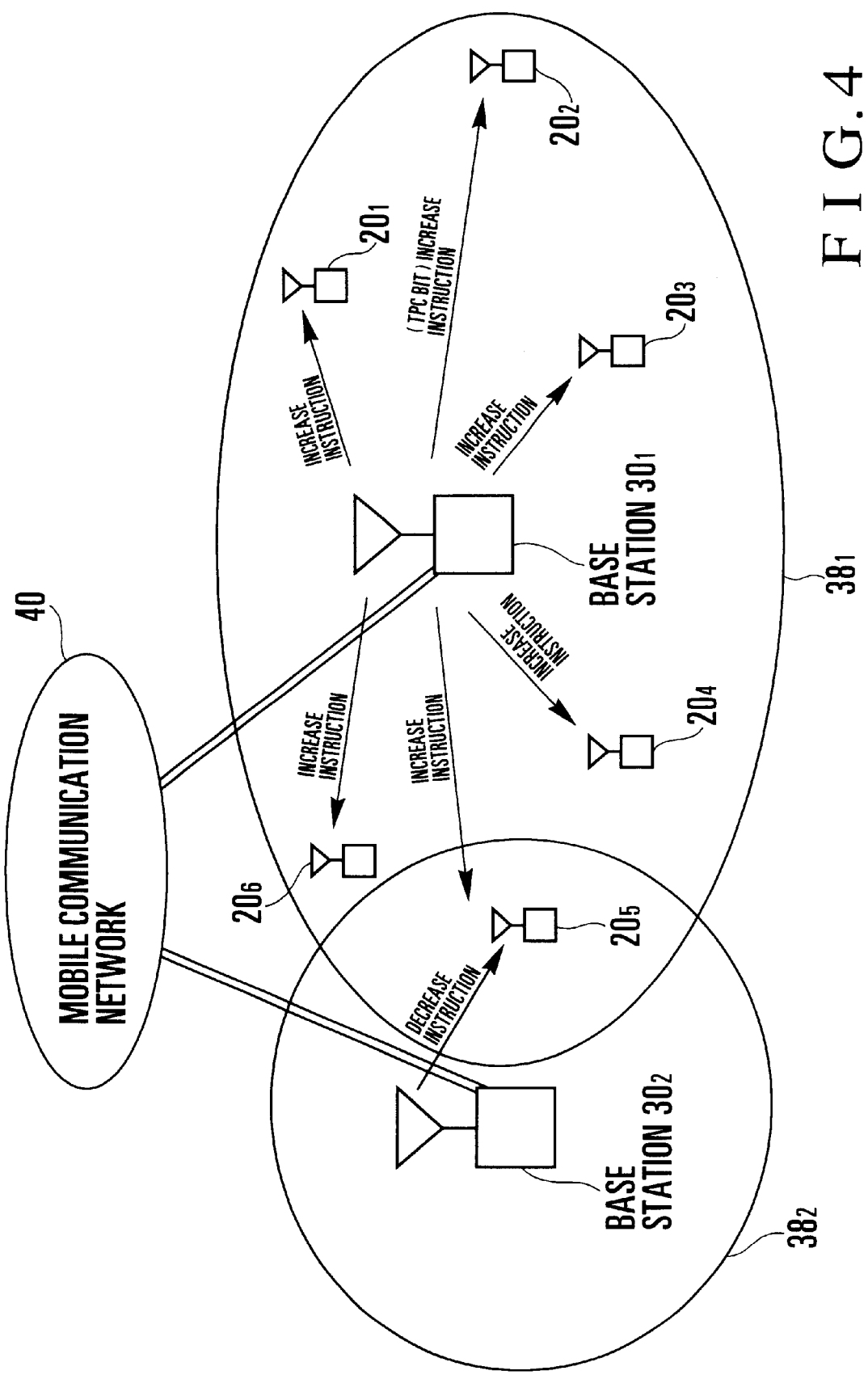
FIG. 4 is a view showing the operation of the base station in the spread spectrum communication system in FIG. 1 in a case wherein the ratio of transmission power increase instructions is larger.

Once the reverse link interference amount in the cell $38_1$ exceeds the allowable value, the base station $30_1$ outputs transmission power increase instructions to all the mobile stations $20_1$ to $20_6$ in the cell $38_1$ to obtain the specified Eb/IO ratio. As a result, the portion of increase instructions becomes larger as a whole in the cell $38_1$. FIG. 4 shows this state.

In this embodiment, therefore, that the reverse link interference amount exceeds the allowable value is detected by checking whether the ratio of increase instruction to TPC bits is large.

Figure 5:
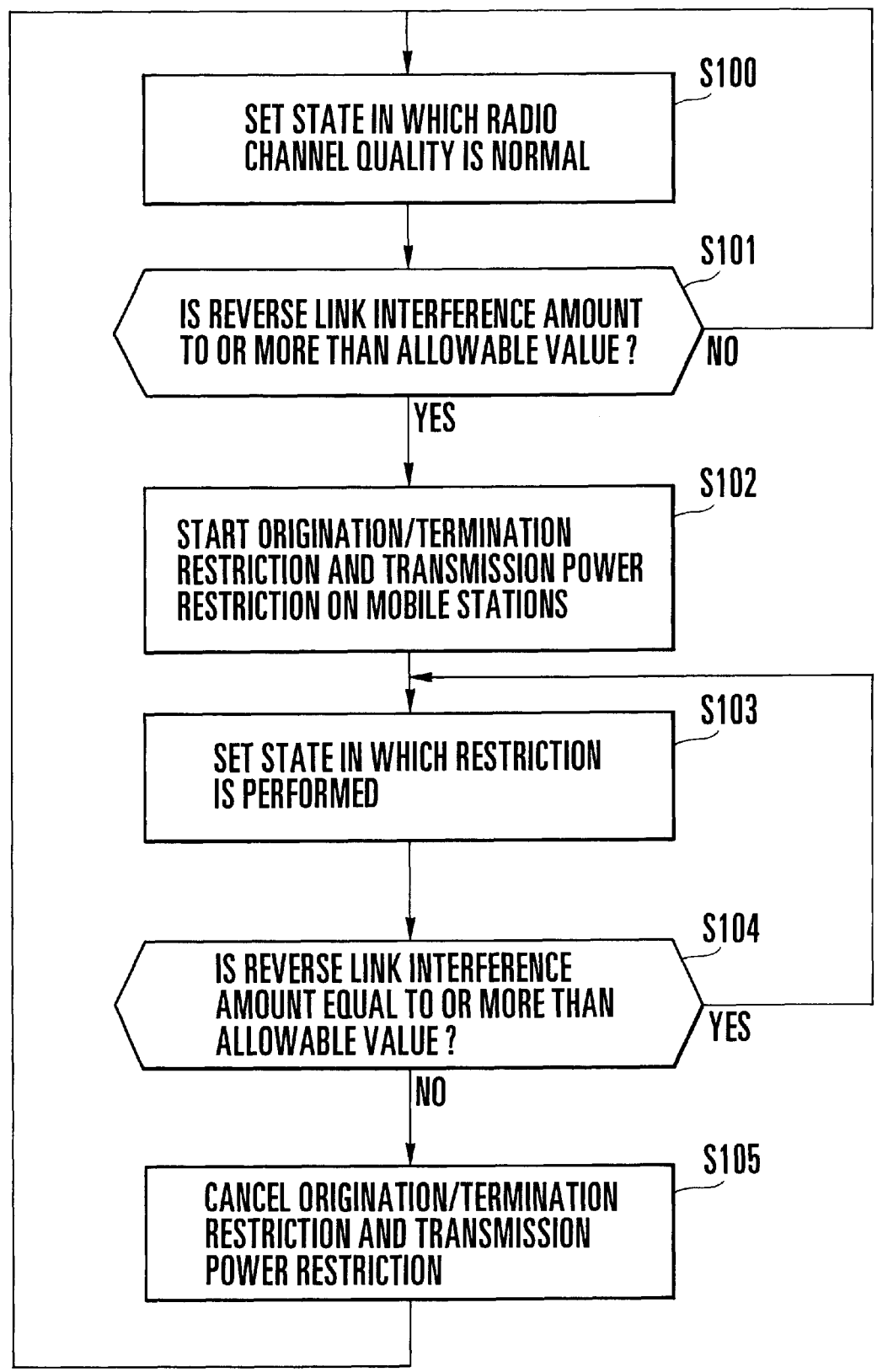
FIG. 5 is a flow chart showing an outline of the operation of the spread spectrum communication system in FIG. 1.

The operation of the spread spectrum communication system of this embodiment will be briefly described next with reference to the flow chart of FIG. 5.

First of all, in a state wherein the radio channel quality is normal, and the ratio of increase instructions to TPC bits in a cell is not large but normal (step S100), it is checked whether the reverse link interference amount between the respective communications in the cell is equal to or more than the allowable value (step S101). If the reverse link interference amount is less than the allowable value, the current state is maintained. When the number of mobile stations $20_1$ to $20_6$ in the cell is equal to or more than the predetermined number, and the ratio of increase instructions to the TPC bits in the cell becomes equal to or more than a predetermined ratio, it is determined in step S101 that the reverse link interference amount in the cell is equal to or more than the allowable value. As a result, the transmission power of each of the mobile stations $20_1$ to $20_6$ in the cell is decreased, and origination/termination with respect to the mobile stations $20_1$ to $20_6$ in the cell formed by an adjacent base station is restricted (step S102). With this control, the reverse link interference amount is decreased to less than the allowable value.

In this manner, origination/termination restriction and transmission power restriction are flexibly performed until the reverse link interference amount becomes less than the allowable value (step S103), thereby optimally maintaining the communication amount and service quality. In this state, it is checked whether the reverse link interference amount becomes less than the allowable value (step S104). If it is determined that the reverse link interference amount becomes less than the allowable value, the origination/termination restriction and transmission power restriction are canceled (step S105). After this cancel operation, the flow returns to step S100 in which the original radio channel is normal.

Figure 6:
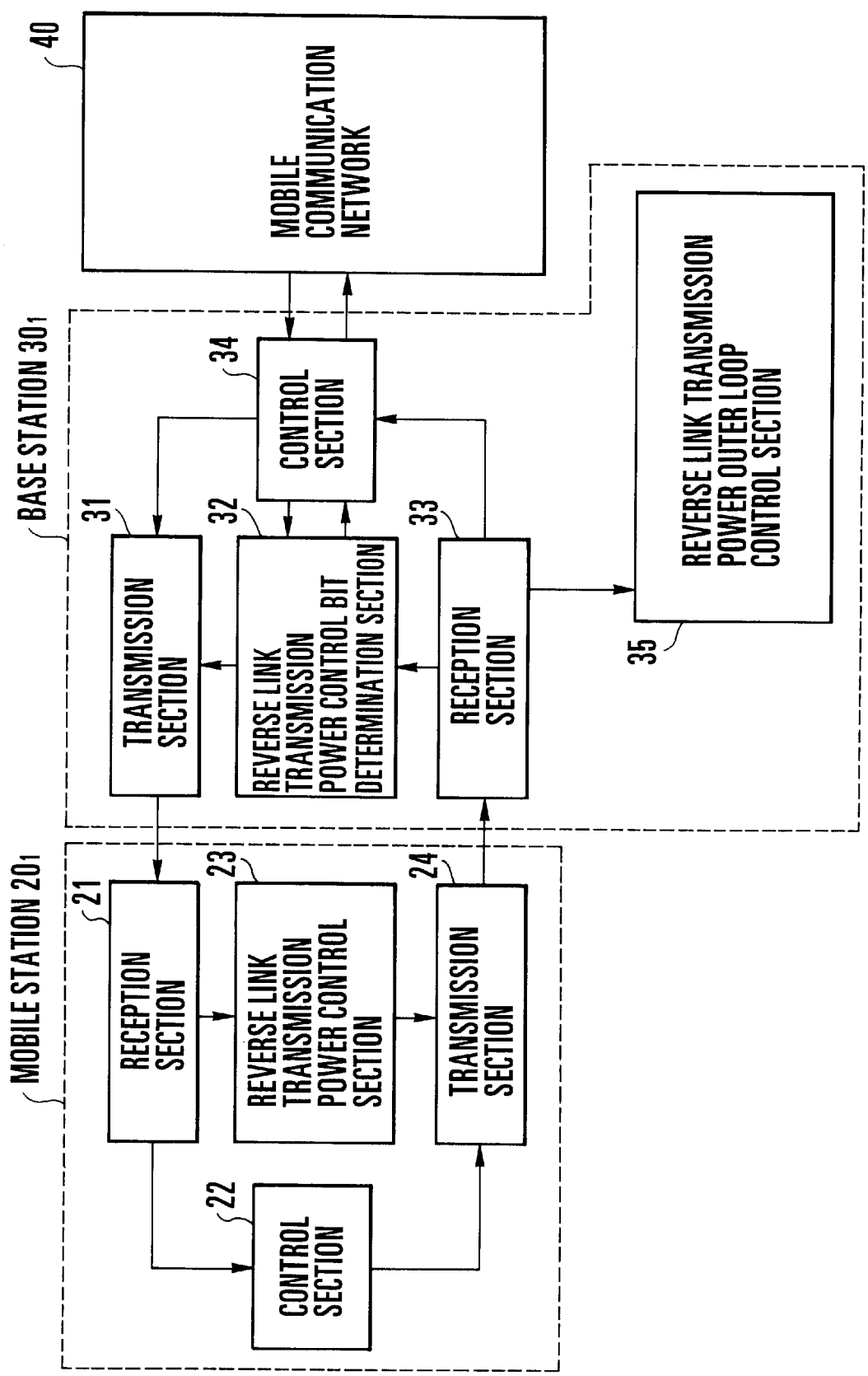
FIG. 6 is a block diagram showing the detailed arrangements of a base station and mobile station in FIG. 1.

FIG. 6 is a block diagram showing the arrangements of a base station and mobile station in FIG. 1.

For the sake of descriptive convenience, FIG. 6 shows only the base station $30_1$ connected to the mobile communication network 40 and the mobile station $20_1$ that performs radio communication. The mobile station $20_1$ is made up of a reception section 21, a reverse link transmission power control section 23, a transmission section 24, and a control section 22.

The reception section 21 receives and decodes a signal from the base station $30_1$ and transfers the decoded signal to the control section 22. The reception section 21 also outputs a TPC bit contained in the decoded data to the reverse link transmission power control section 23. The reverse link transmission power control section 23 changes the transmission power of the transmission section 24 in accordance with the TPC bit from the reception section 21. The transmission section 24 performs transmission with the transmission power instructed by the reverse link transmission power control section 23.

The control section 22 inhibits origination in accordance with an origination restriction signal, from the mobile communication network 40, which is contained in the data transferred from the reception section 21, and cancels origination restriction in accordance with an origination restriction cancel signal. As will be described later, the origination restriction signal is sent from the mobile communication network 40 to the mobile station $20_1$ through the base station $30_1$, and the mobile station $20_1$ having the mobile station identification number designated by the origination restriction signal (for example, designated by the units digit) inhibits new origination.

The base station $30_1$ is made up of a reception section 33, a reverse link transmission power control bit determination section 32, a transmission section 31, a control section 34, and a reverse link transmission power outer loop control section 35.

The reception section 33 receives and decodes a signal from the mobile station $20_1$, performs radio frame error detection, and measures the Eb/IO (the ratio of desired reception wave power to interference wave power) ratio. The reverse link transmission power outer loop control section 35 measures the frame error rate (FER) of reverse link radio frames received by the reception section 33, and sets a specified Eb/IO ratio to set an FER corresponding to predetermined service quality. This specified Eb/IO is set as a reference Eb/IO as a determination criterion in the reverse link transmission power control bit determination section 32.

If the Eb/IO ratio of reverse link radio frames, which is measured by the reception section 33, is equal to or higher than the reference Eb/IO ratio set by the reverse link transmission power outer loop control section 35, the reverse link transmission power control bit determination section 32 generates a TPC bit indicating an instruction to decrease the transmission output of the mobile station. If the Eb/IO ratio of the reverse link radio frames, which is measured by the reception section 33, is lower than the reference Eb/IO ratio, the reverse link transmission power control bit determination section 32 generates and outputs a TPC bit indicating an instruction to increase the transmission output of the mobile station.

The transmission section 31 inserts the TPC bit generated by the reverse link transmission power control bit determination section 32 into a transmission frame, and transmits the resultant frame as transmission data upon reception of an origination restriction signal and origination restriction cancel signal, which is sent from the mobile communication network 40 to the mobile station $20_1$, through the control section 34.

The control section 34 obtains the ratio of increase instructions to the TPC bits to the mobile station $20_1$ in the process of communication. If the number of mobile stations in the process of communication is equal to or larger than the predetermined number, and the ratio of increase instructions to the TPC bits is equal to or higher than the predetermined ratio, the control section 34 determines that the reverse link interference amount in the cell is equal to or larger than the allowable value. As a result, the control section 34 outputs to the reverse link transmission power control bit determination section 32 an instruction to invalidate the currently set reference Eb/IO ratio, and stores the reference Eb/IO ratio.

The control section 34 notifies the mobile communication network 40 that the reverse link interference amount in the cell is equal to or more than the allowable value. In addition, upon reception of an origination/termination restriction signal from the mobile communication network 40, the control section 34 outputs the origination/termination restriction signal to the transmission section 31.

The control section 34 keeps outputting the instruction to decrease the reference Eb/IO ratio to the reverse link transmission power control bit determination section 32 until the increase instruction ratio to the TPC bits becomes the predetermined ratio or less. Upon detecting that the increase instruction ratio to the TPC bits is lower than the predetermined ratio, the control section 34 determines that the reverse link interference amount in the cell $38_1$ has fallen within the allowable value, and gradually restores the reference Eb/IO ratio to the reference Eb/IO ratio immediately preceding the origination/termination restriction.

The control section 34 notifies the mobile communication network 40 that the reverse link interference amount in the cell $38_1$ has fallen within the allowable value (this notification is indicated by "A" in FIG. 1).

With regard to a new originating/termination call generated during origination/termination restriction control (e.g., an originating call from a mobile station other than those subjected to origination restriction or a call associated with a mobile station that has moved into the cell upon hand over), the control section 34 can instruct the reverse link transmission power control bit determination section 32 to set the initial reference Eb/IO ratio as the reference Eb/IO ratio immediately preceding origination/termination restriction so as to maintain the communication quality.

Notified by the base station $30_1$ that the reverse link interference amount in the cell $38_1$ is equal to or more than the allowable value, the mobile communication network 40 outputs origination/termination restriction instructions to the base stations $30_2$ and $30_3$ (FIG. 1) adjacent to the base station $30_1$. Notified by the base station $30_1$ that the reverse link interference amount has fallen within the allowable value, the mobile communication network 40 outputs origination/termination restriction cancel instructions to the base station $30_1$ and the base stations $30_2$ and $30_3$ (FIG. 1) adjacent to the base station $30_1$ (this notification is indicated by "B" in FIG. 1).

The operation of the spread spectrum communication system having the above arrangement will be described in detail next with reference to FIGS. 7, 8, and 9.

Figure 7:
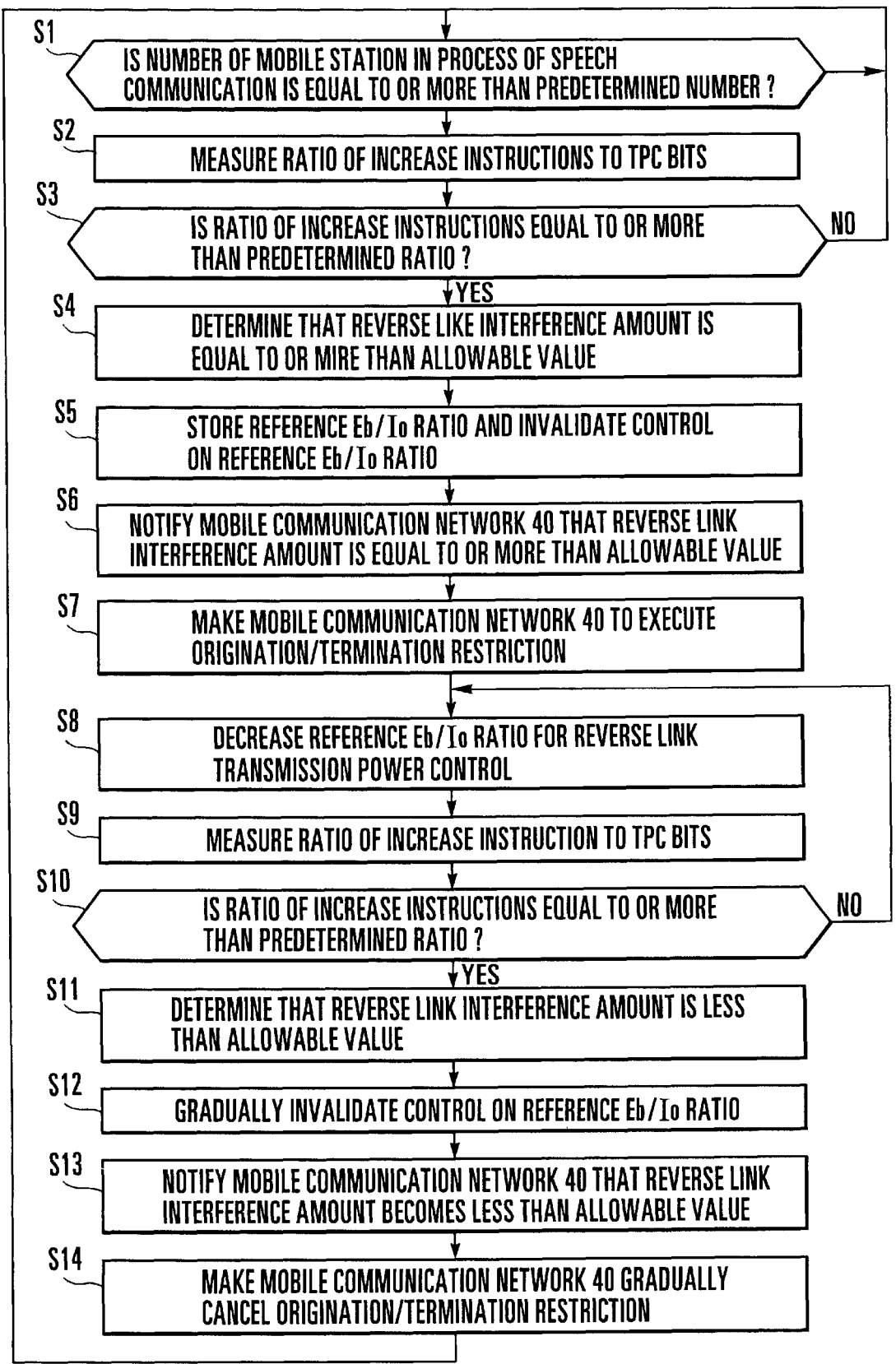
FIG. 7 is a flow chart showing the operation of the spread spectrum communication system in FIGS. 1 and 6.

FIG. 7 is a flow chart for explaining the operation of the spread spectrum communication system in FIG. 6, and more specifically, overload monitoring operation in the base station $30_1$.

The base station $30_1$ performs no operation when the number of mobile stations 20 in the process of communication in the cell $38_1$ is smaller than the predetermined number, but performs overload monitoring operation only when the number of mobile stations 20 is equal to or more than the predetermined number (step S1).

The control section 34 measures the ratio of increase instructions to all the transmission power control (TPC) bits transmitted to the mobile station 20 in the cell $38_1$ (step S2) and checks whether the ratio is equal to or higher than the predetermined ratio (step S3). If the ratio is equal to or higher than the predetermined ratio, the control section 34 determines that the reverse link interference amount in the cell $38_1$ is equal to or more than the allowable value (step S4). For example, this predetermined ratio is set to 60%.

Subsequently, the control section 34 performs reverse link transmission power outer loop control to store the reference Eb/IO ratio set in the reverse link transmission power control bit determination section 32 and invalidates the reference Eb/IO ratio (step S5). The control section 34 notifies the mobile communication network 40 that the reverse link interference amount in the cell $38_1$ is equal to or more than the allowable value (step S6).

Notified that the reverse link interference amount in the cell $38_1$ is equal to or more than the allowable value, the mobile communication network 40 performs origination/termination restriction with respect the base station $30_1$ exhibiting the reverse link interference amount equal to or more than the allowable value and the adjacent base stations $30_2$ and $30_3$ (step S7). As described above, in this case, the mobile communication network 40 designates each mobile station to be subjected to restriction with the units digit of the identification number or an even/odd number. The control section 34 then outputs to the reverse link transmission power control bit determination section 32 an instruction to decrease the reference Eb/IO ratio (step S8).

The control section 34 measures the ratio of increase instructions to the TPC bits again (step S9) and checks whether the ratio is equal to or more than the predetermined ratio (step S10). If the ratio is equal to or more than the predetermined ratio, the control section 34 determines that the reverse link interference amount in the cell $38_1$ does not fall within the allowable value, and instructs the reverse link transmission power control bit determination section 32 to further decrease the reference Eb/IO ratio (step S10).

If it is determined in step S10 that the ratio of increase instructions to the TPC bits in the cell $38_1$ is lower than the predetermined ratio, the control section 34 determines that the reverse link interference amount in the cell $38_1$ is smaller than the allowable value (step S11), and gradually cancels control of the reference Eb/IO ratio with respect to the reverse link transmission power control bit determination section 32, thereby restoring it to the original reference Eb/IO ratio (step S12).

The base station $30_1$ then notifies the mobile communication network 40 that the reverse link interference amount in the cell $38_1$ is smaller than the allowable value (step S13). Notified that the reverse link interference amount in the cell $38_1$ is smaller than the allowable value, the mobile communication network 40 gradually cancels the origination/termination restriction on the base station $30_1$ and the adjacent base stations $30_2$ and $30_3$ (step S14). This operation is performed by gradually decreasing the number of units digits of the identification numbers of mobile stations designated as mobile stations subjected to restriction so as to gradually decrease the number of mobile stations to be subjected to restriction.

An example of how the reference Eb/IO ratio is gradually restored to the reference value before restriction by reverse link transmission power outer loop control in step S12 in the flow chart of FIG. 7 will be described in detail next with reference to FIG. 8.

After it is determined in step S11 that the reverse link interference amount in the cell $38_1$ has fallen within the allowable value, the control section 34 increases the reference Eb/IO ratio set for the reverse link transmission power control bit determination section 32 to make the ratio approach the reference Eb/IO ratio before transmission power restriction (step S12-1).

The control section 34 then measures the ratio of increase instructions to all the TPC bits in the cell $38_1$ (step S12-2) and checks whether the ratio is lower than the predetermined ratio (step S12-3). If it is determined that the ratio is lower than the predetermined ratio, the control section 34 keeps outputting to the reverse link transmission power control bit determination section 32 an instruction to decrease the reference Eb/IO ratio until the ratio of increase instructions to all the TPC bits in the cell $38_1$ becomes equal to or more than the predetermined ratio (step S12-4).

If it is determined in step S12-3 that the ratio of increase instructions to the TPC bits is lower than the predetermined ratio, the control section 34 determines that the reverse link interference amount in the cell $38_1$ falls within the allowable value (step S12-5).

The control section 34 compares the reference Eb/IO ratio currently designated for the reverse link transmission power control bit determination section 32 with the reference Eb/IO ratio before transmission power restriction (step S12-6). If they do not coincide with each other, the control section 34 determines that the specified Eb/IO ratio that satisfies predetermined communication quality has not been obtained. The flow then returns to step S12-1. Subsequently, the processing in steps S12-2 to S12-6 is repeated until the reference Eb/IO ratio currently designated for the reverse link transmission power control bit determination section 32 becomes equal to the reference Eb/IO ratio before transmission power restriction to make the reverse link interference amount in the cell $38_1$ fall within the allowable value.

If it is determined in step S12-6 that the reference Eb/IO ratio currently designated for the reverse link transmission power control bit determination section 32 is equal to the reference Eb/IO ratio before transmission power restriction, the control section 34 determines that the required communication quality is ensured, and the reverse link interference amount in the cell $38_1$ has fallen within allowable value (step S12-7). As a result, the control section 34 notifies the mobile communication network 40 that the reverse link interference amount in the cell $38_1$ has fallen within the allowable value (step S13).

In the spread spectrum communication system of this embodiment, since it is determined on the basis of the ratio of increase instructions to TPC bits whether the reverse link interference amount is equal to or more than the allowable value, whether the reverse link interference amount becomes equal to or more than the allowable value can be determined more accurately and faster than in the prior art. This minimizes interference with neighboring base stations.

In addition, according to the spread spectrum communication system of this embodiment, after the reverse link interference amount exceeding the allowable value is decreased to the allowable value, the communication amount and service quality can be kept optimal near the allowable value until the reverse link interference amount becomes smaller than the allowable value. This is because origination/termination restriction and transmission power restriction can be gradually canceled. If origination/termination restriction and transmission power restriction are canceled at once, the communication amount increases, and the reverse link interference amount greatly increases again, posing a problem in terms of the stability of the mobile communication system.

Second Embodiment

Figure 9:
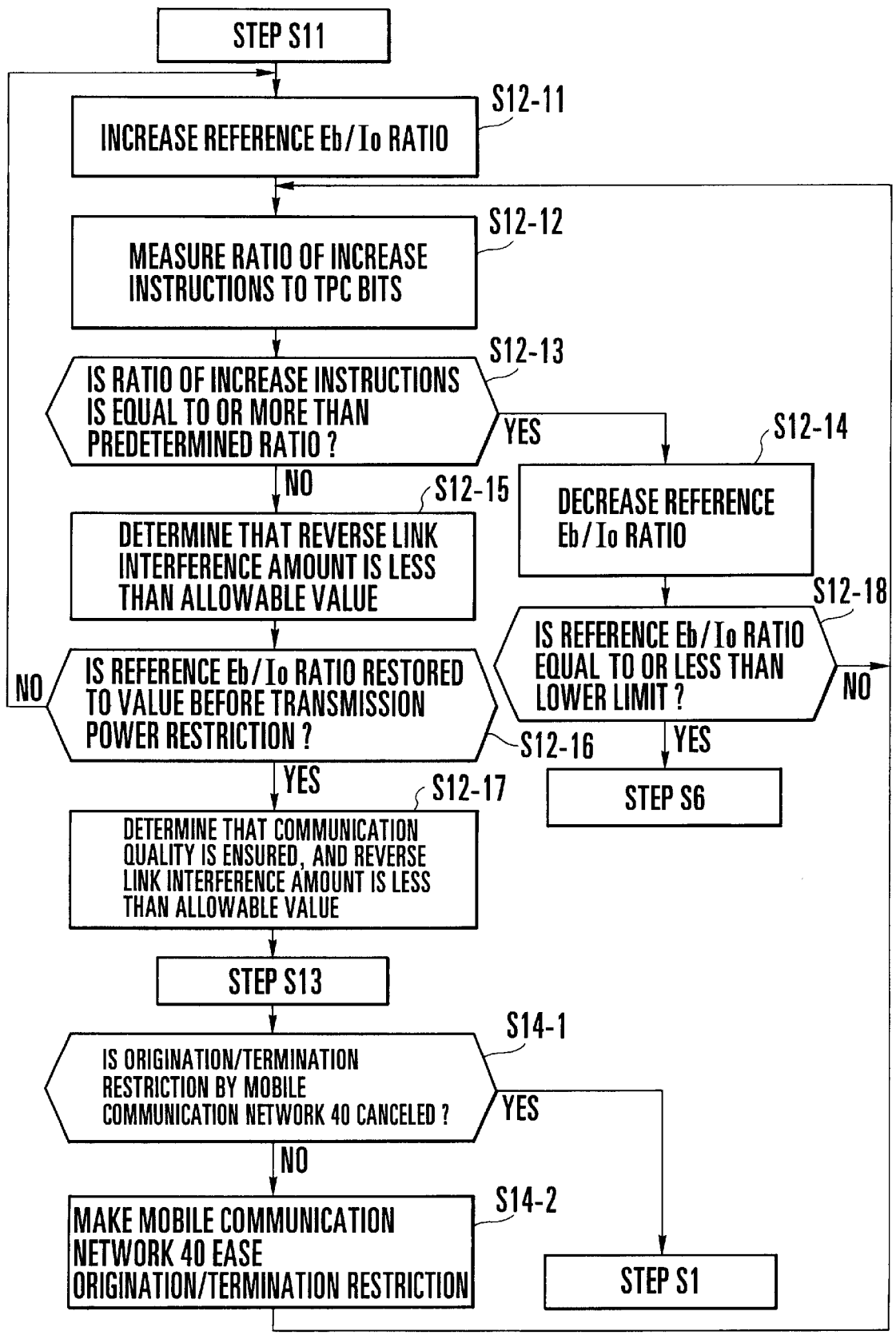
FIG. 9 is a flow chart for explaining the operation of a spread spectrum communication system according to the second embodiment of the present invention.
Figures 10A, 10B:
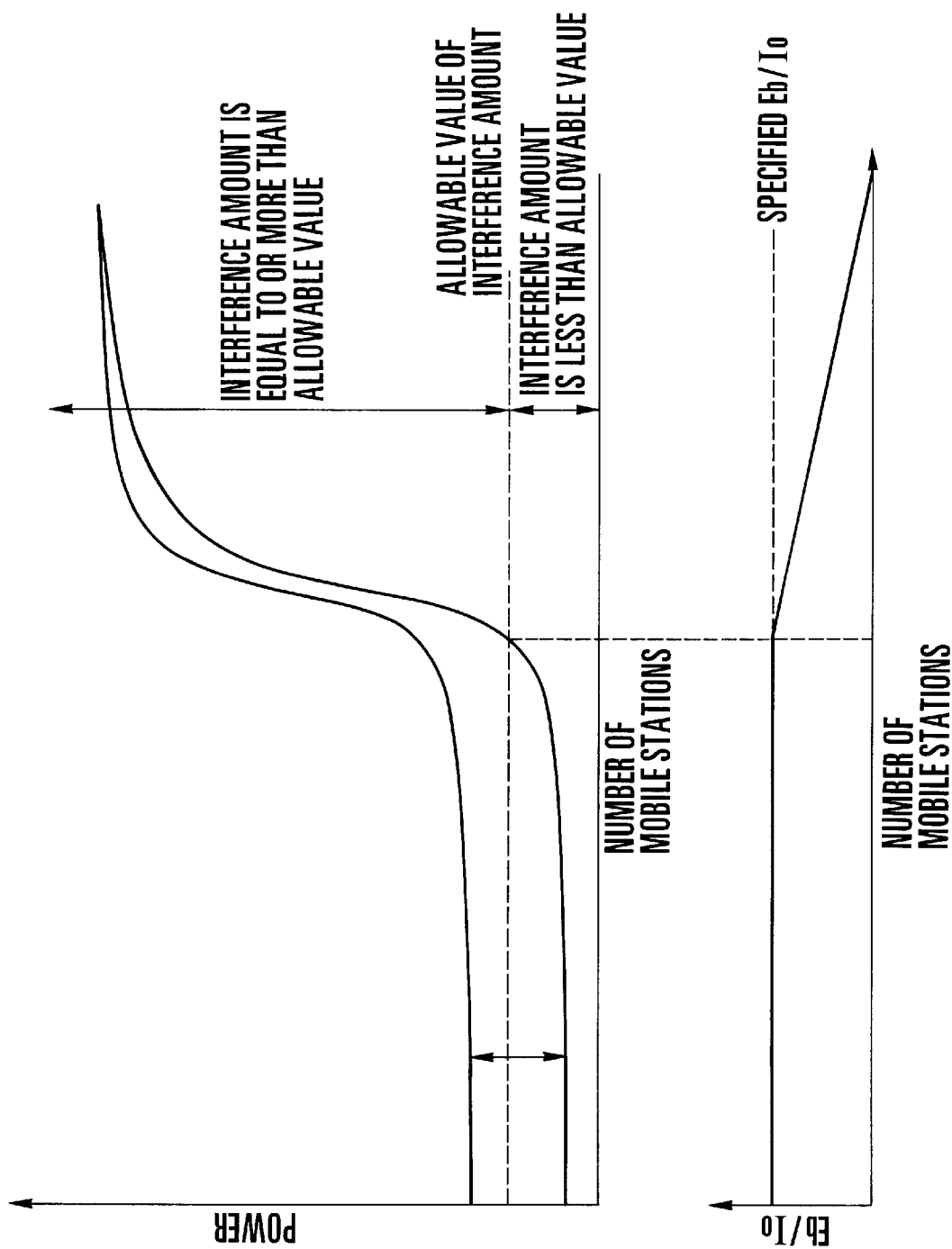
FIGS. 10A and 10B are graphs showing changes in power values and Eb/IO ratio as a function of the number of mobile stations.

FIG. 9 is a flow chart for explaining the operation of a spread spectrum communication system according to the second embodiment of the present invention. Since the arrangement of the second embodiment is the same as that of the first embodiment, a description thereof will be omitted.

The operation of the spread spectrum communication system of this embodiment differs from that of the first embodiment only in that the processing in the flow chart of FIG. 9 replaces the processing in steps S12 and S14 in the flow chart of FIG. 7.

The operation of the spread spectrum communication system of this embodiment will be described in detail next by taking, for example, a case wherein a mobile communication network 40 gradually cancels origination/termination restriction on a base station $30_1$ exhibiting a reverse link interference amount within an allowable value in a cell $38_1$ and adjacent base stations $30_2$ and $30_3$.

Notified by the base station $30_1$ that the reverse link interference amount in the cell $38_1$ has fallen within the allowable value (step S13), the mobile communication network 40 checks whether origination/termination restriction on the base station $30_1$ and the adjacent base stations $30_2$ and $30_3$ is canceled (step S14-1). If the restriction is not canceled, the mobile communication network 40 relaxes all the origination/termination restrictions (step S14-2).

In this case, to relax the origination/termination restrictions is to change, for example, a state wherein connection is permitted for only one mobile station out of ten mobile stations that have generated connection requests to a state wherein connection is permitted for three mobile stations out of ten mobile stations.

If it is determined in step S14-1 that all the origination/termination restrictions are canceled, the flow returns to step S1.

The base station $30_1$ measures the ratio of increase instructions to all the TPC bits in the cell $38_1$ (step S12-12) and checks whether the ratio of increase instructions to the TPC bits is equal to or higher than a predetermined ratio (step S12-13). If the ratio of increase instructions exceeds the predetermined ratio, the base station $30_1$ performs control to decrease the reference Eb/IO ratio for reverse link transmission power control (step S12-14). Subsequently, the base station $30_1$ keeps performing control to decrease the reference Eb/IO ratio for reverse link transmission power control until the ratio of increase instructions to all the TPC bits becomes almost equal to the ratio of decrease instructions (steps S12-12 to S12-14).

In this case, the base station $30_1$ checks whether the reference Eb/IO ratio for reverse link transmission power control is equal to or less than a predetermined lower reference Eb/IO ratio threshold (e.g., the Eb/IO ratio before origination/termination restriction, which is a value for guaranteeing the minimum service quality determined by a person in charge of the mobile communication system) (step S12-18). If the reference Eb/IO ratio is equal to or less than the lower threshold, the base station $30_1$ notifies the mobile communication network 40 that the reverse link interference amount is equal to or more than the allowable value (step S6).

As a result, the mobile communication network 40 performs origination/termination restriction again on the base station $30_1$ exhibiting the reverse link interference amount equal to or more than the allowable value and the adjacent base stations $30_2$ and $30_3$ (step S7 in FIG. 7).

If it is determined in step S12-13 that the ratio of increase instructions is less than the predetermined ratio, the same processing as that in steps S12-3 to S12-6 in FIG. 8 is performed in steps S12-15, S12-16, and S12-17, and the flow advances to step S13.

According to this embodiment, even if the ratio of increase instructions does not become lower than the predetermined ratio when the reference Eb/IO ratio is decreased, since the reference Eb/IO ratio is kept higher than the lower threshold, the minimum communication quality can be maintained.

According to the first and second embodiments, the mobile communication network 40 sets the reverse link interference amount in the cell $38_1$ of the base station $30_1$ to be less than the allowable value. However, the mobile communication network 40 performs similar control on the base stations $30_2$ and $30_3$.

In addition, according to the first and second embodiments, each of base stations $30_1$ to $30_3$ includes the reverse link transmission power outer loop control section 35. However, the mobile communication network 40 may include the reverse link transmission power outer loop control section 35.

Furthermore, according to the first and second embodiments, whether the reverse link interference amount is equal to or more than the allowable value is determined by checking whether the ratio of increase instructions is equal to or more than the predetermined ratio. However, this predetermined ratio may change depending on the number of mobile stations. For example, no transmission power restriction and no origination/termination restriction are performed when the number of mobile stations is 0 to 4; the predetermined ratio is set to 80% when the number of mobile stations is 5 to 10; and the predetermined ration is set to 60% when the number of mobile stations is 11 or more.

As has been described above, according to the present invention, when the reverse link interference amount in a cell becomes equal to or more than an allowable value, appropriate transmission power restriction and origination/termination restriction can be performed more accurately and faster than in the conventional scheme. Therefore, interference with the neighboring base stations can be minimized. This can improve the stability of the spread spectrum communication system.

What is claimed is:

1. An overload control method for a spread spectrum communication system, comprising the steps of:

when the number of mobile stations in the process of communication with a base station in a self-cell is not less than a predetermined number, measuring a ratio of increase instructions to reverse link transmission power control bits contained in radio frames transmitted to said mobile stations from said base station and indicating increases/decreases in transmission power of said mobile stations;

when the measured ratio of increase instructions is not less than a predetermined ratio, determining that a reverse link interference amount between said base station and said mobile stations is not less than an allowable value; and when it is determined that the reverse link interference amount is not less than the allowable value, reducing the reverse link interference amount by performing at least one of transmission power restriction and origination/termination restriction.

2. A method according to claim 1, wherein the predetermined ratio is variably set in accordance with the number of mobile stations in the process of communication in the cell.

3. A method according to claim 1, wherein the step of reducing the reverse link interference amount comprises the steps of:

when it is determined that the reverse link interference amount is not less than the allowable value, starting transmission power restriction to decrease a reference Eb/IO ratio as a criterion for high-speed closed loop control on the transmission power of said mobile stations; and when the ratio of increase instructions to the reverse link transmission power control bits becomes less than the predetermined ratio, gradually decreasing control on the reference Eb/IO ratio.

4. A method according to claim 3, wherein the step of decreasing control comprises the steps of:

gradually decreasing the reference Eb/IO ratio within a range in which the ratio of increase instructions to the reverse link transmission power control bits is less than the predetermined ratio; and when the reference Eb/IO ratio reaches the reference Eb/IO ratio before transmission power restriction, and the ratio of increase instructions to the transmission power control bits becomes less than the predetermined ratio, determining that the reverse link interference amount between the communications has fallen within the allowable value.

5. A method according to claim 1, wherein the step of reducing the reverse link interference amount comprises the steps of:

performing alarm notification to notify a mobile communication network that the reverse link interference amount between the communications is not less than the allowable value;

performing origination/termination restriction on said mobile stations in accordance with an origination/termination restriction instruction from said mobile communication network that responds to the notification;

starting transmission output restriction to decrease the reference Eb/IO ratio as a criterion for high-speed closed loop control on the transmission power of said mobile stations;

when the ratio of increase instructions to the reverse link transmission power control bits becomes less than the predetermined ratio, gradually decreasing the reference Eb/IO ratio in a range in which the ration of increase instructions to the reverse link transmission power control bits is less than the predetermined ratio;

when the reference Eb/IO ratio reaches the reference Eb/IO ratio before transmission output restriction, and the ratio of increase instructions to the reverse link transmission power control bits becomes less than the predetermined ratio, determining that the reverse link interference amount between the communications has fallen within the allowable value;

performing alarm cancel notification to notify said mobile communication network that the reverse link interference amount between the communications has fallen within the allowable value; and canceling origination/termination restriction on said mobile stations in accordance with an origination/termination restriction cancel instruction from said mobile communication network that responds to the alarm cancel notification.

6. A method according to claim 5, wherein the method further comprises the step of determining whether the reference Eb/IO ratio as the reference for high-speed closed loop control is not more than a predetermined lower limit, and when the reference Eb/IO ratio is not more than the lower limit, alarm notification is performed to notify said mobile communication network that the reverse link interference amount between the communications is less than the allowable value.

7. A spread spectrum communication system comprising:

a plurality of mobile stations each of which is connected to a mobile communication network and controls transmission power in accordance with a reverse link transmission power control bit contained in a received frame; and a base station for, when the number of mobile stations in the process of communication is not less than a predetermined number, and a ratio of increase instructions to reverse link transmission power control bits contained in radio frames transmitted to said mobile stations in the process of communication and indicating increases/decreases in the transmission power of said mobile station is not less than a predetermined ratio, determining that the reverse link interference amount between said base station and said mobile stations in a self-cell is not less than an allowable value, and performing at least one of transmission output restriction and origination/termination restriction on said mobile stations.

8. A system according to claim 7, wherein when it is determined that the reverse link interference amount between the communications is not less than the allowable value, said base station performs alarm notification to notify said mobile communication network that the reverse link interference amount between the communications is not less than the allowable value, and performs origination/termination restriction on said mobile stations in accordance with an origination/termination restriction instruction from said mobile communication network that responds to the alarm notification.

9. An apparatus according to claim 8, wherein said base station performs alarm cancel notification to notify said mobile communication network that the reverse link interference amount between the communications has fallen within the allowable value, and cancels origination/termination restriction on said mobile stations in accordance with an origination/termination restriction cancel instruction from said mobile communication network in response to the alarm cancel notification, and said mobile communication network outputs an origination/termination restriction instruction to said base station from which the alarm notification is performed and an adjacent base station in accordance with the alarm notification from said base station, and outputs an origination/termination restriction cancel instruction to said base station from which the alarm cancel notification is performed and said adjacent base stations in accordance with the alarm cancel notification from said base station.

10. A system according to claim 7, wherein said base station starts transmission output restriction to decrease the reference Eb/IO ratio as a reference for high-speed closed loop control on the transmission power of said mobile stations when determining that the reverse link interference amount between the communications is not less than the allowable value, gradually increases the reference Eb/IO ratio within a range in which a ratio of increase instructions to reverse link transmission power control bits is less than a predetermined ratio when the ratio of increase instructions to the reverse link transmission power control bits becomes less than the predetermined ratio, and determines that the reverse link interference amount between communications has fallen within the allowable value when the reference Eb/IO ratio reaches the reference Eb/IO ratio preceding transmission power restriction, and the ratio of increase instructions to the reverse link transmission power control bits becomes less than the predetermined ratio.

11. A system according to claim 7, wherein each of said mobile stations comprises:

reception means for receiving a signal transmitted from said base station and outputting a reverse link transmission power control bit contained in decoded data;

reverse link transmission power control means for designating a change in transmission power in accordance with the reverse link transmission power control bit from said reception means;

transmission means for performing transmission to said base station with the transmission power designated by said reverse link transmission power control means; and control means for restricting and canceling origination/termination in accordance with an origination/termination restriction signal and origination/termination restriction cancel signal contained in the data received by said reception means.

12. A system according to claim 7, wherein said base station comprises:

reception means for receiving and decoding a signal from said mobile station, detecting an error in a radio frame, and measuring an Eb/IO ratio;

reverse link transmission power outer loop control means for measuring a frame error rate of reverse link radio frames received by said reception means, and setting a reference Eb/IO ratio serving as a frame error rate for obtaining predetermined service quality;

reverse link transmission power control bit determination means for generating a reverse link transmission power control bit representing an instruction to decrease a transmission output of said mobile station when a measured Eb/IO ratio of a radio frame is not less than the set reference Eb/IO ratio, and generating a reverse link transmission power control bit representing an instruction to increase the transmission output of said mobile station when a measured Eb/IO ratio of a radio frame is less than the set reference Eb/IO ratio;

transmission means for inserting a reverse link transmission power control bit output from said reverse link transmission power control bit determination means into a transmission frame; and control means for, when the number of mobile stations in the process of communication is not less than a predetermined number, and a ratio of increase instructions to reverse link transmission power control bits to said mobile stations in the process of communication is not less than a predetermined ratio, determining that a reverse link interference amount between communications is not less than the allowable value, outputting to said reverse link transmission power control bit determination means an instruction to invalidate the reference Eb/IO ratio, performing alarm notification to notify said mobile communication network that the reverse link interference amount between the communications is not less than the allowable value, and outputting an origination/termination restriction signal to said transmission means in accordance with an origination/termination restriction instruction from said mobile communication network that responds to the alarm notification, and said transmission means transmits data containing an origination/termination restriction signal from said control means to said mobile station.

13. A system according to claim 12, wherein said control means instructs said reverse link transmission power control bit determination means to decrease the reference Eb/IO ratio until a ratio of increase instructions to reverse link transmission power control bits becomes less than the predetermined ratio when the ratio of instructions to the reverse link transmission power control bits is not less than the predetermined ratio, gradually increases the reference Eb/IO ratio in a range in which the ratio of increase instructions to the reverse link transmission power control bits is less than the predetermined ratio when the ratio of increase instructions to the reverse link transmission power control bits becomes less than the predetermined ratio, and determines that the reverse link interference amount between the communications has fallen within the allowable value when the reference Eb/IO ratio reaches the reference Eb/IO ratio preceding transmission output restriction, and the ratio of increase instructions to the reverse link transmission power control bits becomes less than the predetermined ratio.

14. A system according to claim 13, wherein said mobile communication network outputs an origination/termination restriction instruction to said base station from which the alarm notification is performed and an adjacent base station in accordance with the alarm notification from said base station, and outputs an origination/termination restriction cancel instruction to said base station from which the alarm cancel notification is performed and said adjacent base stations in accordance with the alarm cancel notification from said base station, said transmission means transmits an origination restriction signal and an origination restriction cancel signal to said mobile station in accordance with instructions from said mobile communication network, and said control means outputs an origination/termination restriction cancel signal to said transmission means in accordance with the origination/termination restriction cancel instruction from said mobile communication network, and performs alarm cancel notification to said mobile communication network when determining that the reverse link interference amount between communications has fallen within the allowable value.

15. A method of controlling overload in a spread spectrum communication system in which plural mobile stations are communicating with a base station, the method comprising the steps of:

at the base station determining whether a ratio of increase transmission power instructions to total transmission power control instructions in communications from the base station to the plural mobile stations exceeds a first number;

when the ratio exceeds the first number, determining whether a reverse link interference amount exceeds a second number; and when the reverse link interference amount exceeds the second number, reducing the reverse link interference amount.

16. The method of claim 15, further comprising the initial step of determining whether there are a sufficient number of mobile stations communicating with the base station to invoke the method.

* * * * *